United States Patent Office 2,898,390
Patented Aug. 4, 1959

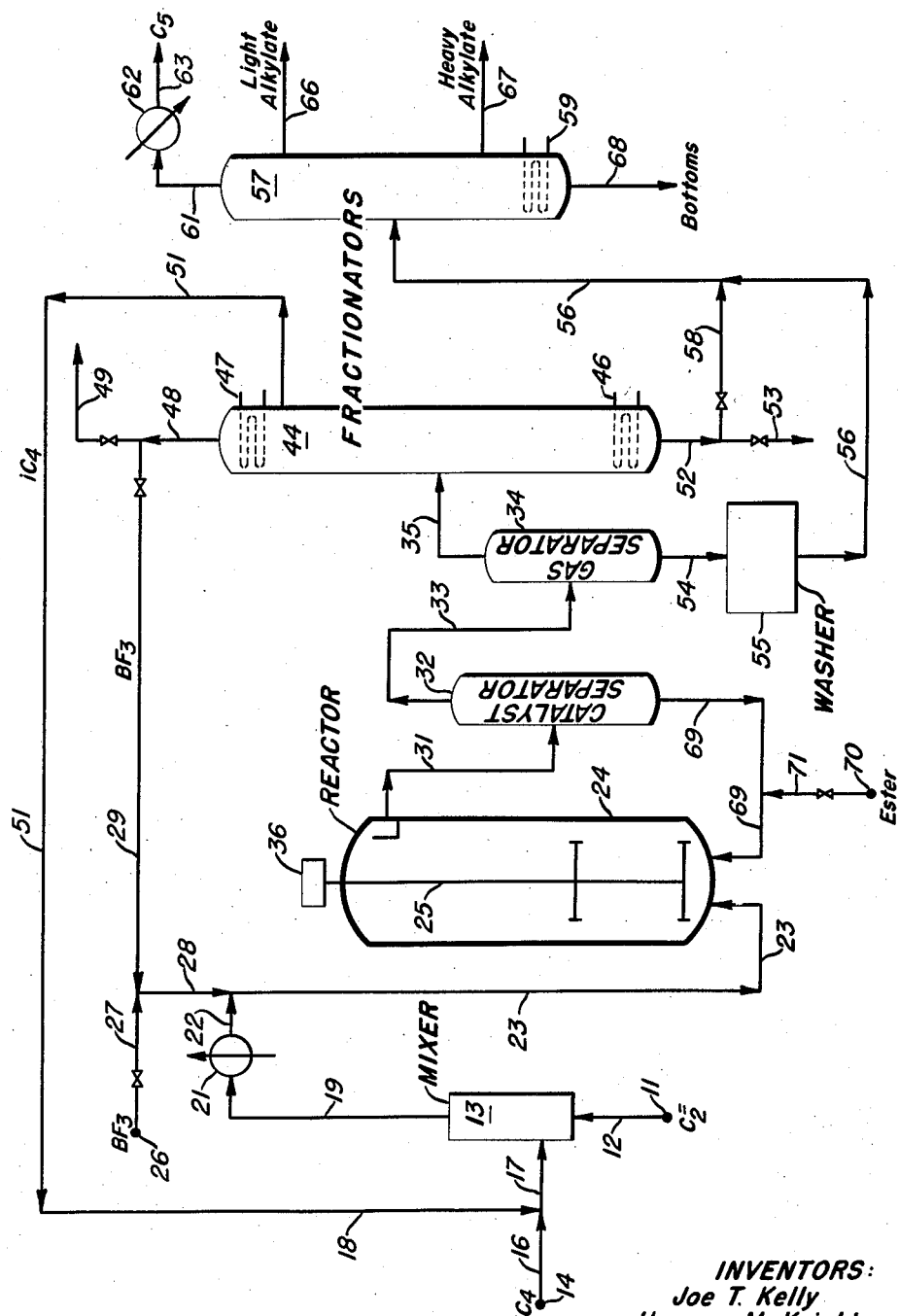

2,898,390
ALKYLATION PROCESS

Joe T. Kelly, Dickinson, and Harmon M. Knight, La Marque, Tex., assignors to The American Oil Company, Texas City, Tex., a corporation of Texas Application January 8, 1958, Serial No. 707,735

11 Claims. (Cl. 260—683.44)

This is a continuation-in-part of our copending applications 605,052 and 605,053 filed August 20, 1956 and now abandoned.

This invention relates to the reaction of isoparaffins or aromatic hydrocarbons and olefins. More particularly it relates to the alkylation of isobutane with ethylene.

In the petroleum industry today, the octane race has placed a strain on facilities and materials needed to make gasoline meeting present day automotive engine requirements. One of the remaining sources of high octane components is the product of the alkylation of isobutane and ethylene. This alkylation is not easy to carry out, particularly on a large scale.

An object of the invention is the alkylation of isoparaffins, particularly isobutane, with olefins, particularly ethylene. Another object is the alkylation of aromatic hydrocarbons with olefins. Other objects will become apparent in the course of the detailed description.

The alkylation of isoparaffins or aromatic hydrocarbons with olefins is carried out in the presence of a novel catalyst pair. One member of the catalyst pair is boron trifluoride. The other member of the catalyst pair is an alkyl acid phosphate ester, that is, an alkyl hydrogen phosphate. Although the second component of the catalyst pair is spoken of as an alkyl acid phosphate, it is believed that the second member is more properly a complex of the hereinafter defined ester and $BF_3$ containing about 1 to 2 moles of $BF_3$ per mole of ester, depending upon the number of free acid groups present in the ester.

Boron trifluoride is one member of the catalyst pair. Commercial grade anhydrous boron trifluoride is suitable for use as one member of the catalyst pair.

The other member of the catalyst pair, hereinafter spoken of as the ester member, is an alkyl acid phosphate, i.e., an alkyl hydrogen phosphate ester.

The ester may be derived from any one of the various forms of phosphoric acid, for example, pyrophosphoric acid, orthophosphoric acid or a polyphosphoric acid. The ester may be used as the liquid or it may be supported on a solid carrier such as charcoal, silica gel, alumina, slag, etc. The ester may be essentially anhydrous or may contain small amounts of water, on the order of 5% or less. The alkyl group present in the ester may contain from 1 to about 13 carbon atoms. The ester may contain either 1 or 2 alkyl groups, i.e., at least 1 hydrogen atom must be present.

The $BF_3$ and the defined ester react to form a viscous material containing complexed $BF_3$. When the ester and $BF_3$ are contacted in a closed vessel, the $BF_3$ partial pressure drops very rapidly at first and then gradually approaches a constant value. It appears that a very rapid reaction between the $BF_3$ and ester takes place.

A complex of the defined ester and $BF_3$ is not as effective for the alkylation in the absence of free-$BF_3$. Free-$BF_3$ is to be understood as $BF_3$ existing in the reaction zone which is not complexed with the defined ester. As soon as the ester has complexed with some $BF_3$, the beneficial catalytic effect exists. Thus free-$BF_3$ may exist in the reaction zone, as evidenced by the formation of alkylate, even though all of the ester has not been complexed. In a batch system, wherein less $BF_3$ is present than is theoretically required to complex all the ester present, eventually little further alkylation will occur as charge is added, since all of the $BF_3$ will have been complexed.

In general, the process is carried out utilizing an amount of $BF_3$ which is in excess of that required to complex with all the ester present in the contacting zone, namely, in excess of about 1 mole of $BF_3$ per acid equivalent of ester present. More than the minimum amount of free-$BF_3$ is beneficial, in fact, the yield of alkylate increases rapidly with increase in free-$BF_3$ present, up to a maximum amount. The amount of free-$BF_3$ used is dependent somewhat upon the reactants themselves. However, when reacting isoparaffins and olefins, the free-$BF_3$ usage is desirably, set out on a $BF_3$ to olefin weight ratio, of at least about 0.2. In other words, at least about 0.2 lb. of free-$BF_3$ per lb. of olefin charged to the alkylation zone is desirable. About 1.5 parts by weight of $BF_3$ per part of olefin charged appears to be about the desirable maximum usage of $BF_3$. It is preferred to use between about 0.35 and 1 part by weight of free-$BF_3$ per part by weight of olefin when utilizing the lower molecular weight olefin, such as ethylene and propylene.

The process may be carried out at any temperature below the temperature at which the ester-$BF_3$ complex, as well as the ester itself, decomposes. The temperature of operation may be as low as $-20°$ C. or even lower. Temperatures as high as $125°$ C. and even higher may be used with some of the esters which have relatively high decomposition temperatures. Low temperatures appear to favor the formation of the hydrocarbons having 6 carbon atoms.

Sufficient pressure is maintained on the system to keep a substantial portion of the hydrocarbons charged in the liquid state. The process may be carried out at relatively low pressures, for example 100 p.s.i., or it may be carried out at elevated pressures, for example 2000 p.s.i., or more. In general, pressures will be between about 200 and 1000 p.s.i. and preferably between about 300 and 600 p.s.i.

The contacting of the isoparaffin or aromatic hydrocarbon and the olefin in the presence of the defined catalyst pair is continued until an appreciable amount of alkylate has been formed. In batch reactions, it is possible to convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin or aromatic to olefin, the degree of mixing in the contacting zone and the catalyst usage. A few tests will enable one to determine the optimum time of contacting for the particular system of operating conditions being tried.

The reactants in the hydrocarbon charge to the alkylation process are isoparaffin, or aromatic and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. It is preferred to operate with ethylene or propylene.

The aromatic hydrocarbons must be alkylatable by the particular olefin used. It is self-evident that an aromatic hydrocarbon which contains alkyl substituents positioned so that steric hinderance would prevent or greatly reduce the possibility of alkylation with the particular olefin should not be subjected to the process. Examples of particularly suitable aromatic hydrocarbons are benzene, toluene, xylene, trimethylbenzene, and other alkyl analogues, such as propyl and butyl; the naphthalene aromatic hydrocarbons, such as the mono and di-substituted methylnaphthalenes.

The isoparaffin reactant is defined as a paraffinic hydrocarbon which has a tertiary hydrogen atom, i.e., paraffins which have a hydrogen atom attached to a tertiary carbon atom. Examples of these are isobutane, isopentane (2-methylbutane), 2-methylpentane, 2-methylhexane, 3-methylhexane, 2,3-dimethylbutane (di-isopropyl) and 2,4-dimethylhexane. Thus the isoparaffins usable as one reactant in the process contain from 4 to 8 carbon atoms.

In the isoparaffin-olefin system, the alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more aromatic hydrocarbons, or 2 or more olefins may be charged. In general, when a particular product distribution is desired, it is preferable to operate with a single isoparaffin and a single olefin, for example, technical grade isobutane and ethylene, both of about 95% purity.

The reactants may be mixed together before they are charged into the reactor. Or, they may be charged into the reactor separately. Or, a portion of the olefin may be blended with the isoparaffin or aromatic before introduction into the reactor and the remainder of the olefin injected into the reactor. The charge may be introduced all at one point into the reactor or it may be introduced at 2 or more points. The alkylation reaction is exothermic and temperature control is facilitated by introducing the olefin into the reactor at more than one point.

The $BF_3$ member of the catalyst pair may be premixed with the isoparaffin and olefin before introducing these into the reactor but this should not be done when an extremely reactive system such as isobutanes and isobutylene or aromatic hydrocarbons and olefins are being used; or when an olefin that is very rapidly polymerizable is being used. The $BF_3$ may be blended with the isoparaffin reactant and introduced into the reactor with this member when the isoparaffin and the olefins are being introduced separately. The $BF_3$ may also be introduced directly into the reaction zone independently from the hydrocarbons charged. The $BF_3$ may be introduced into the reactor at a single point or at several points to help control temperature and reaction rate.

The reactor may be a vessel providing for a batch-type reaction, i.e., one wherein the desired amount of isoparaffin or aromatic and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reactor may be a stirred vessel wherein the reactants and free-$BF_3$ are flowed through a liquid pool of the ester-$BF_3$ complex, the space velocity being controlled so that the desired amount of reaction is obtained during the passage of the reactants through the pool. Other methods of operation common in the catalytic refining aspects of the petroleum industry utilizing viscous liquid catalyst may be readily devised.

It has been pointed out that the ester member of the catalyst pair is really a complex of the alkyl acid phosphate and $BF_3$; the $BF_3$ apparently reacting with the ester. The complex may be preformed, by exposing the ester to $BF_3$ for a time sufficient to introduce some $BF_3$ into the ester component or even enough to complex all the ester; this being done before the reactants are introduced into the reaction zone or even before the ester member of the catalyst pair is positioned in the reaction zone. The complex may be formed in situ during a batch-type reaction. In the batch-type operation, it is convenient to introduce all the $BF_3$ into the reaction vessel at once. This amount of $BF_3$ is sufficient not only to complex the ester but also provide the desired amount of free-$BF_3$. In a stirred system, the ester-$BF_3$ member may be prepared in situ by charging fresh ester to the reaction zone and forming the complex during the initial passage of reactants and $BF_3$ through the pool. Some alkylation reaction occurs even though the pool has not taken up sufficient $BF_3$ to complex all the ester. As the flow of reactants and $BF_3$ continues through the pool, eventually the ester will become saturated with respect to $BF_3$. At this time, the amount of $BF_3$ introduced into the reaction zone should be cut back to that amount of free-$BF_3$ desired, under this particular set of operating conditions.

The illustrative embodiment set out in the annexed figure forms a part of this specification. It is pointed out that this embodiment is schematic in nature, that many items of process equipment have been omitted, since these may be readily added by those skilled in this art and that this embodiment is only one of many which may be devised, and that the invention is not to be limited to this particular embodiment.

In the figure, it is desired to produce a high yield of diisopropyl for use as a blending material for gasoline. Ethylene from source 11 is passed by way of line 12 into mixer 13. Liquid isobutane from source 14 is passed by way of lines 16 and 17 into mixer 13. Both the ethylene and the isobutane are about 90% purity, the remainder being n-butane and ethane, with trace amounts of other components found in materials derived from petroleum refining sources. Mixer 13, in this instance, is a simple orifice-type mixer suitable for intermingling a liquid and a gas, or two liquids. Recycle isobutane from line 18 is passed by way of line 17 into mixer 13. In this embodiment, the molar ratio of isobutane to ethylene is 6.

From mixer 13, the blend of isobutane and ethylene is passed by way of line 19, through heat exchanger 21, where the temperature of the blend is adjusted to 30° C. The temperature of the blend leaving exchanger 21, the stream of isobutane and ethylene is passed by way of lines 22 and 23 into the bottom of reactor 24.

Boron trifluoride is passed from source 26 by way of valved line 27 and line 28 into line 23, where it meets the stream of isobutane and ethylene. If desirable, a mixer may be introduced into line 23 to insure complete intermingling of the $BF_3$ and the hydrocarbon charge. Recycle $BF_3$ is introduced from line 29 by way of lines 28 and 23. In this embodiment, the ester is completely complexed with respect to $BF_3$ and only the necessary free-$BF_3$ is introduced by way of line 28. The weight ratio of free-$BF_3$ from line 28 to ethylene present in line 23 is 1:1.

Reactor 24 is shown as a vertical cylindrical vessel containing turbine stirrers 25 driven by motor 36. In order to maintain the temperature in the reactor at substantially 10° C., other cooling means may be introduced through the pool of liquid in reactor 24 by means not shown.

In this embodiment, the reactor was charged with diethyl hydrogen orthophosphate containing about 1% of water. The ester was contacted with $BF_3$ in an amount such that all of the ester was complexed with BF$_3$. This operation was carried out before reactants were introduced into the reactor. The reactor pressure was maintained at 600 p.s.i. This permits maintaining the isobutane and substantially all of the ethylene in the liquid state.

The product hydrocarbon mixture, complex, and free-BF$_3$ is passed out of reactor 24 by way of line 31. The stream from line 31 is passed into catalyst separator 32 where the BF$_3$, isobutane, pentanes and alkylate product are separated from the complex and taken out by way of line 33. The stream from line 33 is passed into gas separator 34 where the BF$_3$, isobutane, some pentanes and some alkylate product are taken overhead by way of line 35. The material taken overhead from gas separator 34 is passed into fractionator 44.

Fractionator 44 is adapted to separate the BF$_3$ as a gas, the isobutane as a liquid and the higher boiling materials as a bottom product. Fractionator 44 is provided with an internal reboiler 46 and an internal condenser 47. BF$_3$ and unreacted ethylene are taken overhead from fractionator 44 by way of line 48 and may be passed out of the system by way of valved line 49. The material from line 49 may be periodically passed to a BF$_3$ purification operation to remove non-condensable inert gases which build up in the system. Ordinarily the stream from line 48 is recycled by way of valved lines 29 and lines 28 and 23 to reactor 24.

Isobutane is withdrawn as a liquid stream by way of line 51 and is recycled by way of lines 18 and 17 to mixer 13 for reuse in the process. Bottoms product from fractionator 44 is withdrawn by way of line 52 and may be passed to storage or further processing by way of valved line 53. This stream from line 52 consists substantially of isopentane. Some unsaturated C$_5$ hydrocarbons are also present and also a small amount of higher boiling alkylate material.

The liquid hydrocarbons from gas separator 34 are passed by way of line 54 into washing operation 55, where occluded ester is removed; for example, by caustic treatment. The washed material is passed by way of line 56 into fractionator 57. The bottoms product from fractionator 44 may be passed by way of valved line 58 and line 56 into fractionator 57 for complete removal of the alkylate material. In this embodiment, the bottoms are passed to fractionator 57.

Fractionator 57 is provided with an internal reboiler 59 and is adapted to produce the desired alkylate products from the hydrocarbon product mixture entering from line 56. A vapor stream is taken overhead by way of line 61, is condensed in cooler 62 and is passed to storage by way of line 63. The material from line 63 consists substantially of isopentane and some unsaturated C$_5$ material. This material may be used as a high octane blending stock for the production of motor gasoline of the desired volatility characteristics.

The alkylate product herein is considered to be that boiling above the pentane range and boiling below the maximum temperature usable in motor gasoline. In general, a 415° F. endpoint alkylate is blendable into motor gasoline without adverse effect in a specification calling for a 400° F. gasoline endpoint. Thus the alkylate product is considered to be the material boiling between about the lower limit of the hexane range and 415° F. in the ASTM distillation procedure.

A considerable difference exists between the octane number of the C$_6$ fraction of the alkylate product and the higher boiling material. The C$_6$ fraction, which boils from about 110° to 170° F. has an F-1 octane number of 101. The C$_7$+ material has an octane number which ranges between about 75 and 85, depending somewhat on the fractionation.

Light alkylate, which includes all the C$_6$ material and some of the C$_7$ material, is withdrawn from fractionator 57 by way of line 66. Heavy alkylate, which includes most of the C$_7$ and material boiled up to 415° F. is withdrawn from fractionator 57 by way of line 67. A small amount of higher boiling bottoms is withdrawn by way of line 68.

The heavy ester-BF$_3$ complex carried over into catalyst separator 32 is removed by way of line 69 and returned to the bottom of reactor 24. Make-up ester may be introduced by way of valved line 71 and line 69.

The results obtainable by the process of the instant invention are set out in illustrative runs below.

In Table I, there are set out results in the testing of various alkyl acid orthophosphates by means of batch operation. In these runs, the tests were carried out under what are more or less standard conditions, namely, a 4-liter carbon steel bomb was dried overnight in a stream of hot air at 110° C. The ester to be tested (90 grams) was charged to the bomb as a liquid and the bomb was evacuated. One kilogram of a dry blend of ethylene and iso-

*Table I*

| Run No. | 1 | 2 | 3 | 4 | 5 [1] |
|---|---|---|---|---|---|
| Ester | Diethyl Hydrogen Orthophosphate | Ethyl dihydrogen Orthophosphate | Diisooctyl hydrogen Orthophosphate | Isooctyl dihydrogen Orthophosphate | Ethyl dihydrogen Orthophosphate |
| Conditions: | | | | | |
| Isobutane/Olefin (Molar) | 2.8 | 2.8 | 2.8 | 2.8 | 2.8 |
| Hydrocarbon/Ester (Weight) | 11.0 | 11.2 | 11.2 | 11.1 | 5.6 |
| BF$_3$/Ethylene (Weight) | 0.7 | 0.8 | 0.7 | 0.8 | 0.5 |
| Time (Hours) | 20 | 20 | 20 | 20 | 20 |
| Temperature (° C.) | 20–25 | 20–25 | 20–25 | 20–25 | 30–35 |
| Pressure Range (p.s.i.g.) | 302–84 | 348–97 | 303–155 | 323–146 | 195–150 |
| Yields (On C$_2$=Charged), Wt. percent: | | | | | |
| iC$_5$ | 0 | 9 | 16 | 21 | 3 |
| C$_6$ (110–165° F.) | 114 | 122 | 89 | 106 | 47 |
| C$_7$ (165–194° F.) | 8 | 6 | 5 | 9 | 2 |
| C$_8$ (194–266° F.) | 49 | 46 | 49 | 56 | 34 |
| C$_9$ + | 34 | 32 | 63 | 55 | 6 |
| Total Alkylate (Depentanized) | 205 | 206 | 206 | 226 | 89 |
| Ethylene Converted | 100 | 100 | 98 | 100 | 58 |
| MS Analysis, C$_6$ Cut (Mol Percent):[2] | | | | | |
| 2,3-Dimethylbutane | 89.2 | 91.0 | 91.0 | 89.2 | |
| 3-Methylpentane | 4.0 | 3.0 | 4.7 | 4.1 | |
| 2,2-Dimethylbutane | 0.2 | 1.0 | 2.8 | 2.4 | |
| n-Hexane | 0.0 | 0.2 | 0.4 | 0.6 | |
| 2-Methylpentane | 6.6 | 4.8 | 1.1 | 3.7 | |

[1] Catalyst for this test prepared by complexing BF$_3$ with ester prior to run. No excess BF$_3$ added. Catalyst contained 37.8 wt. percent BF$_3$.
[2] Mass spectrometer.

butane was added and then $BF_3$ (90 grams) was pressured in. The charged bombs were placed in a rocker and allowed to rock for 20 hours. At the end of this time the liquid catalyst layer was withdrawn from the bomb. The hydrocarbon was then water washed to remove dissolved $BF_3$ and ester. A sample was submitted for Podbielniak distillation. A $C_6$ cut from the Podbielniak distillation was analyzed by mass spectrometer. In some cases after sampling, the remaining major portion of the product was debutanized on an Oldershaw column and then fractionated on a packed column.

The results in Table I show that excellent yields were obtained with all the esters when free-$BF_3$ was present. Run No. 5, which was carried out with a preformed complex of ethyl dihydrogen orthophosphate and $BF_3$, using no free-$BF_3$ in the reactor, had a very markedly lower yield and low conversion of ethylene.

The physical characteristics of these esters are set out in Table II.

Table II

|  | Sp. Gr. (25° C.) | $n_D^{25}$ | Decomposition Point, ° C. |
|---|---|---|---|
| Ethyl dihydrogen Orthophosphate | 1.430 | 1.427 | 165-170 |
| Isooctyl dihydrogen Orthophosphate | 1.089 | 1.444 | 195-200 |
| Diethyl hydrogen Orthophosphate | 1.333 | 1.421 | 160-165 |
| Diisooctyl hydrogen Orthophosphate | 1.020 | 1.443 | 215-220 | temperature was maintained at 30°–40° C. After all the diisobutylene was added, the reaction mixture was stirred for 5 minutes, separated, washed and then distilled on a 15-plate Oldershaw column.

Results of this test are shown in Table III.

Table III

| | |
|---|---|
| Toluene/Diisobutylene (molar) | 2 |
| Percent toluene reacting | 81.4 |
| Percent t-Butyl toluene (molar) [1] | 63.1 |
| Isomer distribution: | |
| m-t-Butyl toluene | 13 |
| p-t-Butyl toluene | 87 |
| Percent purity of t-Butyl toluene cut | 100 |
| Wt. percent material boiling above: | |
| t-Butyl toluene (based on total hydrocarbon charge) | 25.4 |

[1] On toluene charged.

The high para to meta-t-butyl toluene ratio is of great interest.

In Table IV there are set out results in the testing of various alkyl acid pyrophosphates by means of batch operation under conditions described for Tests 1–4.

The results in Table IV show that over 200% of depentanized alkylate product is obtained by the catalyst pair of the invention. In Run 9, all the ethylene was converted; 90% being converted in the other runs. The $C_6$ cut contained over 90% of diisopropyl.

Table IV

| Run No. | 7 | | 8 | | 9 | |
|---|---|---|---|---|---|---|
| Ester | Diisoamyl Hydrogen Pyrophosphate | | Diethyl Hydrogen Pyrophosphate | | Diisooctyl Hydrogen Pyrophosphate | |
| Conditions: | | | | | | |
| Isobutane/Olefin (Molar) | 3.1 | | 3.1 | | 2.8 | |
| Hydrocarbon/Ester (Weight) | 21.0 | | 21.0 | | 11.3 | |
| $BF_3$/Ethylene (Weight) | 0.3 | | 0.3 | | 0.8 | |
| Time (Hours) | 20 | | 20 | | 20 | |
| Temperature (° C.) | 20-30 | | 20-30 | | 20-25 | |
| Pressure Range (.ps.i.g.) | 260-140 | | 236-85 | | 301-119 | |
| | Wt. Percent | Br. No. | Wt. Percent | Br. No. | Wt. Percent | Br. No. |
| Yields (On $C_2$= Charged): | | | | | | |
| $iC_5$ | 27 | | 25 | | 15 | |
| $C_6$ (110-165° F.) | 96 | 0.0 | 69 | 0.0 | 104 | 0.0 |
| $C_7$ (165-194° F.) | 8 | 0.1 | 8 | 0.0 | 13 | 0.0 |
| $C_8$ (194-266° F.) | 54 | 0.0 | 39 | 0.2 | 53 | 3.9 |
| $C_9$+ | 55 | | 28 | | 53 | |
| Total Alkylate (Depentanized) | 213 | | 144 | | 223 | |
| Ethylene Converted | 90 | | 89 | | 100 | |
| MS Analysis, $C_6$ Cut (Mol Percent)[1]: | | | | | | |
| 2,3-Dimethyl butane | 91.3 | | | | 91.8 | |
| 3-Methylpentane | 4.7 | | | | 4.0 | |
| 2,2-Dimethylbutane | 2.6 | | | | 3.4 | |
| 2-Methylpentane | 1.4 | | | | 0.2 | |
| n=Hexane | 0.0 | | | | 0.6 | |

[1] Mass spectrometer.

Run No. 6

*Depolyalkylation of toluene.*—A stirred glass reaction flask fitted with condenser, dropping funnel and thermometer was used for this test. The catalyst was prepared by saturating ethyl dihydrogen orthophosphate with $BF_3$. The finished catalyst contained 37.8% $BF_3$. The catalyst (280 ml.) and 644 g. of nitration grade toluene were charged to the reaction vessel. A total of 403 g. of technical grade diisobutylene was then slowly added to the reaction vessel over a period of 55 minutes. The pot The physical properties of the three esters used are set out in Table V.

Table V

|  | Sp. Gr. (25° C.) | $n_D^{25}$ | Decomposition Point, ° C. |
|---|---|---|---|
| Diethyl Hydrogen Pyrophosphate | 1.507 | 1.437 | 141-146 |
| Diisoamyl Hydrogen Pyrophosphate | 1.149 | 1.432 | 164-168 |
| Diisooctyl Hydrogen Pyrophosphate | 1.093 | 1.448 | 175-180 |

Run No. 10

Triethyl phosphate was used as the ester in a run carried out under the procedure of runs 1-4. This pair produced a yield of alkylate indistinguishable from operation with $BF_3$ alone, i.e., this ester is not a promoter. The conditions and yields are set out below.

| | |
|---|---|
| Isobutane/ethylene (molar) | 3.2 |
| $BF_3$/ethylene (weight) | 0.8 |
| Hydrocarbon/ester (weight) | 11.3 |
| Temperature, °C. | 30-35 |
| Pressure, p.s.i.g. | 310-275 |
| Yields (on ethylene charged): | |
| Isopentane | 3 |
| $C_6+$ | 33 |
| Alkylate (depentanized) | 33 |

Thus having described the invention, what is claimed is:

1. An alkylation process comprising contacting (a) an alkylatable feed hydrocarbon from the class consisting of (1) isoparaffin having from 4 to 8 carbon atoms and (2) aromatic hydrocarbon and (b) an olefin having from 2 to 12 carbon atoms, in the presence of a catalyst comprising essentially (i) an alkyl hydrogen phosphate ester having at least one hydrogen atom and at least one alkyl group containing from 1 to 13 carbon atoms, and (ii) $BF_3$, said $BF_3$ being present in an amount in excess of about 1 mole per mole of said ester, at a temperature between about −30° C. and a temperature substantially below the temperature at which said ester decomposes, and at a pressure sufficient to maintain a substantial portion of said reactants in the liquid state, and separating a hydrocarbon product mixture containing alkylate product of said feed hydrocarbon and said olefin.

2. An alkylation process wherein an isoparaffin having from 4 to 8 carbon atoms and an olefin having from 2 to 12 carbon atoms are contacted, in a molar ratio of isoparaffin to olefin between about 2 and 50, at a temperature between about −20° C. and 125° C. and a pressure between about 100 and 2000 p.s.i., said pressure being at least sufficient to keep a substantial portion of said reactants in the liquid state, for a time sufficient to permit an appreciable amount of alkylation reaction to take place, in the presence of a catalyst comprising essentially (i) an alkyl hydrogen phosphate ester having at least one hydrogen atom and at least one alkyl group containing from 1 to 13 carbon atoms, and (ii) boron trifluoride, said $BF_3$ being present in an amount in excess of one mole per mole of said ester present, removing a product hydrocarbon mixture from said contacting zone and an alkylate hydrocarbon product is separated from said mixture.

3. The process of claim 2 wherein the $BF_3$ is present in an amount, in excess of 1 mole per mole of ester, such that the free-$BF_3$ to olefin weight ratio is between about 0.2 and 1.5.

4. The process of claim 2 wherein said isoparaffin is isobutane.

5. The process of claim 2 wherein said isoparaffin is diisopropyl.

6. The process of claim 2 wherein said olefin is ethylene.

7. The process of claim 2 wherein said olefin is propylene tetramer.

8. The process of claim 2 wherein said ester is diethyl hydrogen orthophosphate.

9. The process of claim 2 wherein said ester is diisooctyl hydrogen orthophospate.

10. The process of claim 2 wherein said ester is diethyl hydrogen pyrophosphate.

11. The process of claim 2 wherein said ester is diisooctyl hydrogen pyrophosphate.

No references cited.